(12) United States Patent
Gustavsson et al.

(10) Patent No.: US 11,016,481 B2
(45) Date of Patent: May 25, 2021

(54) ERROR DETECTION AND RESETTING OF A ROBOTIC WORK TOOL

(71) Applicant: HUSQVARNA AB, Huskvarna (SE)

(72) Inventors: Jakob Gustavsson, Jönköping (SE); Andreas Källming, Tranås (SE)

(73) Assignee: HUSQVARNA AB, Huskvarna (SE)

(*) Notice: Subject to any disclaimer, the term of this patent is extended or adjusted under 35 U.S.C. 154(b) by 406 days.

(21) Appl. No.: 15/571,637

(22) PCT Filed: Apr. 28, 2016

(86) PCT No.: PCT/SE2016/050373
§ 371 (c)(1),
(2) Date: Nov. 3, 2017

(87) PCT Pub. No.: WO2016/178616
PCT Pub. Date: Nov. 10, 2016

(65) Prior Publication Data
US 2018/0129199 A1 May 10, 2018

(30) Foreign Application Priority Data

May 4, 2015 (SE) .................................. 1550548-0

(51) Int. Cl.
*G05B 19/04* (2006.01)
*G05B 19/18* (2006.01)
(Continued)

(52) U.S. Cl.
CPC ......... *G05D 1/0016* (2013.01); *A01D 34/008* (2013.01); *G05D 1/0044* (2013.01); *G05D 1/0055* (2013.01); *G05D 2201/0208* (2013.01)

(58) Field of Classification Search
CPC .. G05D 1/0016; G05D 1/0044; G05D 1/0055; G05D 2201/0208; G05D 1/021;
(Continued)

(56) References Cited

U.S. PATENT DOCUMENTS 5,934,051 A * 8/1999 Hahn ...................... B60K 28/04
56/10.2 R
2003/0151202 A1 * 8/2003 Fisher ........................ A63F 9/30
273/447
(Continued)

FOREIGN PATENT DOCUMENTS

CN 103576567 A * 2/2014
CN 103576567 A 2/2014
(Continued)

OTHER PUBLICATIONS

Machine Translation in English (CN103576567-A) (Year: 2014).*
(Continued)

*Primary Examiner* — Harry Y Oh
(74) *Attorney, Agent, or Firm* — Burr & Forman, LLP (57) ABSTRACT

A method of controlling a mobile communication device comprising a wireless communication interface and a display is disclosed. The method comprising: executing a mobile application for controlling a robotic work tool; receiving an error signal through said wireless communication interface from said robotic work tool; displaying an error status on the display; disabling functions relating to an operating state; receiving a reset signal through said wireless communication interface from said robotic work tool; and in response thereto enabling the functions relating to an operating state.

12 Claims, 7 Drawing Sheets

(51) Int. Cl.
*G05D 1/00* (2006.01)
*A01D 34/00* (2006.01)

(58) Field of Classification Search
CPC .... G05D 1/02; A01D 34/008; A01D 2101/00; A01D 34/00; G06F 11/00
See application file for complete search history.

(56) References Cited

U.S. PATENT DOCUMENTS

| | | | | |
|---|---|---|---|---|
| 2005/0261799 | A1* | 11/2005 | Groth | E02F 3/435 |
| | | | | 700/180 |
| 2014/0047299 | A1* | 2/2014 | Ikeda | G06F 11/30 |
| | | | | 714/764 |
| 2015/0007541 | A1* | 1/2015 | Albinger | A01D 34/66 |
| | | | | 56/10.2 A |

FOREIGN PATENT DOCUMENTS

| | | |
|---|---|---|
| CN | 104010879 A | 8/2014 |
| CN | 104470685 A | 3/2015 |
| EP | 1598155 A1 | 11/2005 |
| GB | 2481447 A | 12/2011 |
| JP | H03148709 A | 6/1991 |
| JP | 2010061484 A | 3/2010 |
| WO | 8702483 A | 4/1987 |
| WO | 2013/141206 A1 | 9/2013 |

OTHER PUBLICATIONS

International Search Report and Written Opinion for International Application No. PCT/SE2016/050373 dated Jun. 7, 2016.
International Preliminary Report on Patentability for International Application No. PCT/SE2016/050373 dated Nov. 7, 2017.
International Type Search Report for Swedish Application No. 1550548-0 dated Nov. 13, 2015.

* cited by examiner

ERROR DETECTION AND RESETTING OF A ROBOTIC WORK TOOL

TECHNICAL FIELD

This application relates to a robotic work tool, a robotic work tool system, a method and a computer-readable storage medium for improved control of a robotic work tool.

BACKGROUND

Conventional robotic work tools such as robotic lawnmowers usually operate within a work area in a garden by traversing the work area according to an irregular movement pattern. Such irregular movements will reduce the risk of tracks being formed in the lawn by the lawnmower as well as the risk of incomplete or unbalanced grass cutting attendance to the entire work area over time. For one common type of robotic lawnmowers, a boundary wire, or guide cable, is used to define the perimeter of the work area. By means of sensors in the robotic lawnmower, the lawnmower will detect when it approaches or crosses the boundary wire, and automatically change its propulsion direction so that the work area is not escaped and the lawnmower remains within the intended work area.

Due to the (seemingly) irregular work pattern, the robotic work tool may appear at any position in the work area at any time. As such, control of the robotic work tool is beneficial in that the robotic work tool may be controlled to leave an area or return to the charging station—or other service location.

Prior art solutions provide for a return home functionality where a button on the charging station is pressed, which results in a signal being transmitted through the boundary wire which signal the robotic work tool picks up and then returns to the charging station.

However, this requires the user to move to the charging station and it also takes time for the robotic work tool to actually return to the charging station.

Some contemporary robotic work tools are equipped with a wired control interface. One example of this is the Viking robotic lawnmower iMow 622. However, this requires the user to always be close to the robotic work tool when controlling it.

SUMMARY

The inventors of the present invention have realized, after inventive and insightful reasoning that by requiring the user to visit the robotic work tool as an error has occurred, the robotic work tool will at least receive a (partial) visual inspection before being restarted. Any further errors not being detected automatically can thus be detected by the user.

It is therefore an object of the teachings of this application to overcome one or more of the problems and shortcomings listed above by providing a robotic work tool for movable operation within a work area. The robotic work tool comprises comprising a wireless communication interface and a controller. The controller is configured to cause the robotic work tool to movably operate; detect an error; transmit an error signal through the wireless communication interface to a mobile application for controlling the robotic work tool; receive an internal reset signal; transmit a reset signal through the wireless communication interface to the mobile application for controlling the robotic work tool.

Until a reactivation signal is received by the robotic work tool, the robotic work tool is effectively disabled from operation by the mobile application.

In one embodiment the robotic work tool is a robotic lawnmower.

In another embodiment, the robotic work tool is a golf ball retrieving robot, snow clearing robot or farming robot.

It is also an object of the teachings of this application to overcome one or more of the problems and shortcomings listed above by providing a robotic work tool system comprising a charging station and a robotic lawnmower according to the above.

It is also an object of the teachings of this application to overcome one or more of the problems and shortcomings listed above by providing a mobile communication device comprising a wireless communication interface, a display, a memory and a controller, wherein said controller is configured to execute a mobile application for controlling a robotic work tool according to above, wherein the controller is configured to: receive an error signal through said wireless communication interface from said robotic work tool; display an error status on the display; disable functions relating to an operating state; receive a reset signal through said wireless communication interface from said robotic work tool; and in response thereto enable the functions relating to an operating state.

In one embodiment the mobile communication device is a smartphone.

It is also an object of the teachings of this application to overcome one or more of the problems and shortcomings listed above by providing a robotic work tool system according to above further comprising mobile communications device according to the above.

It is a further object of the teachings of this application to overcome one or more of the problems and shortcomings listed above by providing a method of controlling a robotic work tool comprising a wireless communication interface. The method comprises causing the robotic work tool to movably operate; detecting an error; transmitting an error signal through the wireless communication interface to a mobile application for controlling the robotic work tool; receiving an internal reset signal; transmitting a reset signal through the wireless communication interface to the mobile application for controlling the robotic work tool.

It is a further object of the teachings of this application to overcome one or more of the problems and shortcomings listed above by providing a method of controlling a mobile communication device comprising a wireless communication interface and a display, the method comprising: executing a mobile application for controlling a robotic work tool; receiving an error signal through said wireless communication interface from said robotic work tool; displaying an error status on the display; disabling functions relating to an operating state; receiving a reset signal through said wireless communication interface from said robotic work tool; and in response thereto enabling the functions relating to an operating state.

It is moreover an object of the teachings of this application to overcome one or more of the problems and shortcomings listed above by providing a computer readable storage medium encoded with instructions that, when executed on a processor, perform a method referred to above.

Using the teachings herein, a robotic work tool such as a robotic lawnmower is thus provided which allows for a remote control while providing a safety in all aspects of operation as for a manually controlled robotic work tool.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings, in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
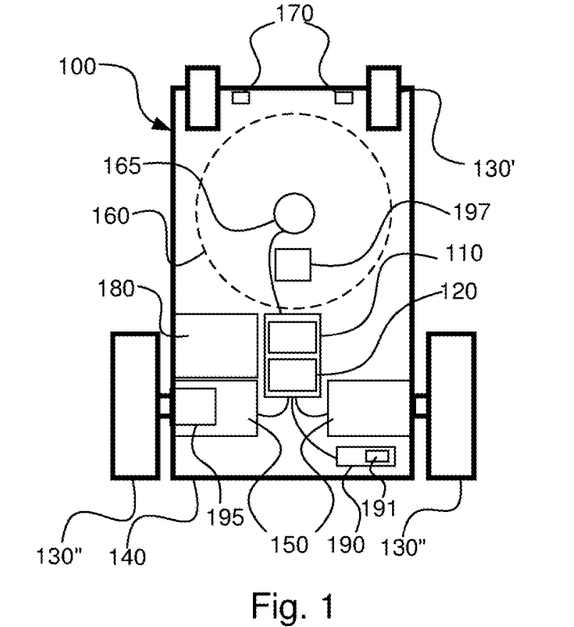
FIG. 1 shows a schematic overview of a robotic lawnmower according to one embodiment of the teachings of this application.

FIG. 1 shows a schematic overview of a robotic work tool such as a robotic lawnmower 100, being an example of a vehicle, having a body 140 and a plurality of wheels 130. In the exemplary embodiment of FIG. 1 the robotic lawnmower 100 has 4 wheels 130, two front wheels 130' and the rear wheels 130". At least some of the wheels 130 are drivably connected to at least one electric motor 150. It should be noted that even if the description herein is focussed on electric motors, combustion engines may alternatively be used possibly in combination with an electric motor.

In the example of FIG. 1, each of the rear wheels 130" is connected to a respective electric motor 150. This allows for driving the rear wheels 130" independently of one another which, for example, enables steep turning.

The robotic lawnmower 100 also comprises a controller 110. The controller 110 may be implemented using instructions that enable hardware functionality, for example, by using executable computer program instructions in a general-purpose or special-purpose processor that may be stored on a computer readable storage medium (disk, memory etc.) 120 to be executed by such a processor. The controller 110 is configured to read instructions from the memory 120 and execute these instructions to control the operation of the robotic lawnmower 100 including, but not being limited to, the propulsion of the robotic lawnmower. The controller 110 may be implemented using any suitable, publically available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic lawnmower 100 may further have at least one sensor 170; in the example of FIG. 1 there are two sensors 170, arranged to detect a magnetic field (not shown). If present, the sensors 170 will be connected to the controller 110, and the controller 110 will be configured to process any signals received from the sensors 170. The sensor signals may be caused by the magnetic field caused by a control signal being transmitted through a boundary wire (for more details on charging stations, control signals and boundary wires, see the description below with reference to FIG. 2). This enables the controller 110 to determine whether the robotic lawnmower 100 is close to or crossing a boundary wire, or inside or outside an area enclosed by the boundary wire.

The robotic lawnmower 100 also comprises a work tool 160, which may be a grass cutting device, such as a rotating blade 160 driven by a cutter motor 165. The cutter motor 165 is connected to the controller 110 which enables the controller 110 to control the operation of the cutter motor 165. The controller may also be configured to determine the load exerted on the rotating blade, by for example measure the power delivered to the cutter motor 165 or by measuring the axle torque exerted by the rotating blade. The robotic lawnmower 100 also has (at least) one battery 180 for providing power to the motors 150 and the cutter motor 165.

The robotic lawnmower 100 is also arranged with a satellite navigation device 190 which comprises a satellite signal receiver 191. In the disclosed embodiment, the satellite signal receiver 191 is a GNSS (Global Navigation Satellite System) satellite signal receiver, such as a GPS (Global Positioning System) satellite signal receiver. The satellite navigation device 190 is connected to the controller 110 for enabling the controller 110 to determine current positions for the robotic lawnmower 100 using the satellite navigation device 190 and to control the movements of the robotic lawnmower 100 based on the determined positions.

The robotic lawnmower 100 may further comprises at least one deduced reckoning navigation sensor 195 for providing signals for deduced reckoning navigation, also referred to as dead reckoning. Examples of such deduced reckoning navigation sensor(s) 195 are odometers and compasses.

The robotic lawnmower 100 may further be arranged with a wireless communication interface 197 for communicating with other devices, such as a server, a personal computer or smartphone, or the charging station. Examples of such wireless communication devices are Bluetooth™, WiFi™ or cellular communication standards such as Global System Mobile (GSM) and LTE (Long Term Evolution) to name a few.

Figure 2:
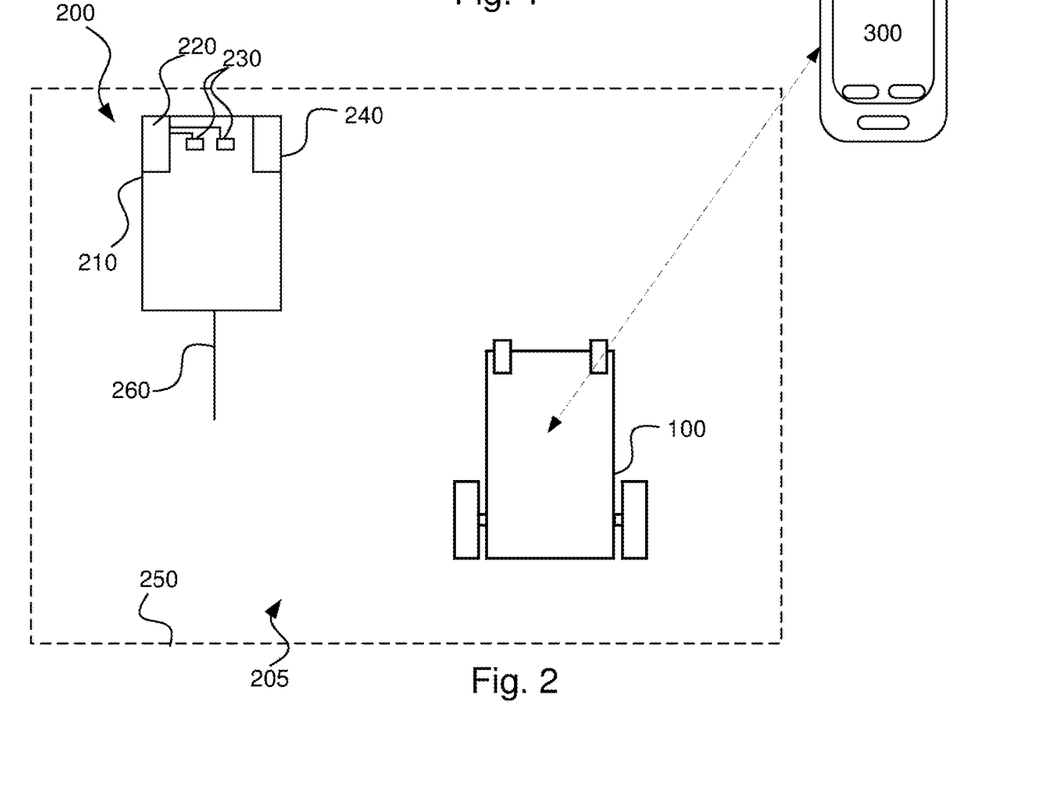
FIG. 2 shows a schematic view of a robotic working tool system with a robotic lawnmower according to one embodiment of the teachings of this application.

FIG. 2 shows a schematic view of a robotic lawnmower system 200 in one embodiment. The schematic view is not to scale. The robotic lawnmower system 200 comprises a charging station 210 and a boundary 250 arranged to enclose a work area 205, in which the robotic lawnmower 100 is supposed to serve. The robotic lawnmower 100 uses the satellite navigation device 190 to remain within the work area 205 by comparing the successive determined positions of the robotic lawnmower 100 against a set of geographical coordinates defining the boundary 250 of the work area 205. This set of boundary defining positions may be stored in the memory 120, and/or included in a digital (virtual) map of the work area 205. The boundary 250 of the work area 205 may also be marked by a boundary cable supplementing the GNSS navigation to ensure that the robotic work tool stays within the work area, even when no satellite signals are received.

The charging station 210 has a charger 220, in this embodiment coupled to two charging plates 230. The charging plates 230 are arranged to co-operate with corresponding charging plates (not shown) of the robotic lawnmower 100 for charging the battery 180 of the robotic lawnmower 100. The charging station 210 also has, or may be coupled to, a signal generator 240 for providing a control signal (not shown) to be transmitted through the boundary wire 250. The control signal preferably comprises a number of periodic current pulses. As is known in the art, the current pulses will generate a magnetic field around the boundary wire 250 which the sensors 170 of the robotic lawnmower 100 will detect. As the robotic lawnmower 100 (or more accurately, the sensor 170) crosses the boundary wire 250 the direction of the magnetic field will change. The robotic lawnmower 100 will thus be able to determine that the boundary wire has been crossed, and take appropriate action by controlling the driving of the rear wheels 130" to cause the robotic lawnmower 100 to turn a certain angular amount and return into the work area 205. For its operation within the work area 205, in the embodiment of FIG. 2A, the robotic lawnmower 100 mainly uses the satellite navigation device 190, supported by the deduced reckoning navigation sensor 195 as will be described in some more detail further below.

The use of more than one sensor 170 enables the controller 110 of the robotic lawnmower 100 to determine how the robotic lawnmower 100 is aligned with relation to the boundary wire 250 (if such is used) by comparing the sensor signals received from each sensor 170. This enables the robotic lawnmower to follow the boundary wire 250, for example when returning to the charging station 210 for charging. Optionally, the charging station 210 may have a guide cable 260 for enabling the robotic lawnmower to find the entrance of the charging station 210. In one embodiment the guide cable 260 is formed by a loop of the boundary wire 250. In one embodiment the guide wire 260 is used to generate a magnetic field for enabling the robotic lawnmower 100 to find the charging station without following a guide cable 260.

According to the teachings herein, a communications device 300, such as a smartphone, is provided for controlling the robotic work tool 100. The smartphone 330 communicates with the robotic work tool through the wireless communication interface 197.

The use of a smartphone for controlling the robotic work tool 100 remotely comes with many benefits such as the already in the smartphone comprised display for providing information and also for receiving various commands. Furthermore, smartphones are easy to update with new software, either for a same model of a robotic work tool or for a new robotic work tool model.

A smartphone enabled to control and/or communicate with a robotic work tool according to the teachings herein may be regarded as being part of the robotic work tool system 200, even though it is sold separately and even if the software application enabling the smartphone 300 to communicate and/or control the robotic work tool is downloaded and/or purchased separately—even if no explicit price or sum is charged when downloading the software application.

Figure 3:
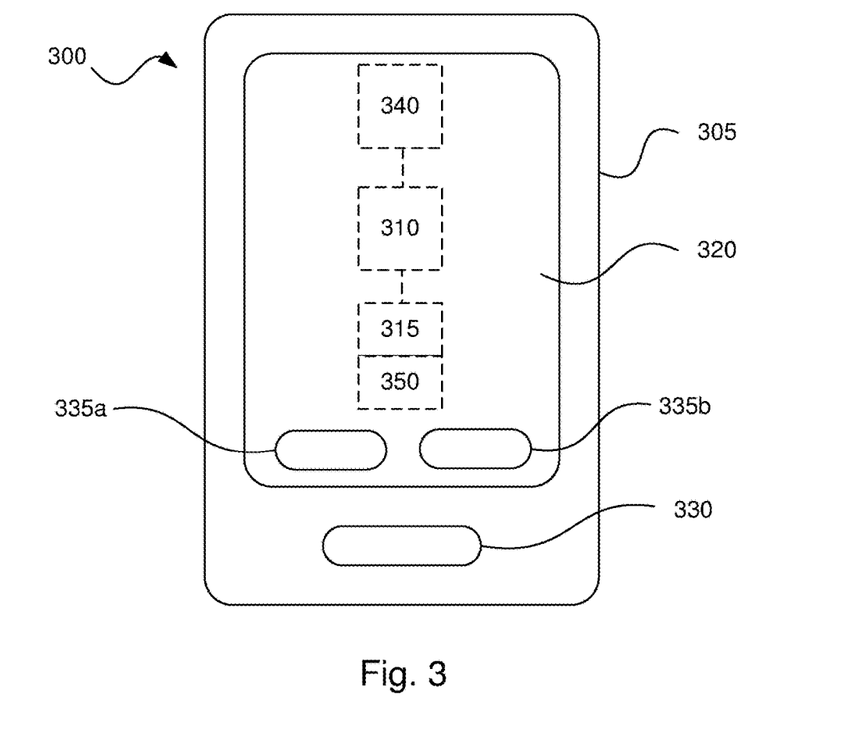
FIG. 3 shows a schematic view of mobile communications device for controlling a robotic working tool according to one embodiment of the teachings of this application.

FIG. 3 shows a schematic view of a communications terminal in the form of a smartphone 300 or a tablet computer (arranged with a wireless communication interface), both being examples of mobile communication devices, that comprises a housing 305 in which a display 320 is arranged. In one embodiment the display 320 is a touch display. In other embodiments the display 320 is a non-touch display. Furthermore, the smartphone 300 comprises a user interface in this example comprising a physical key 330. In this embodiment there is one key 330, but any number of keys is possible and depends on the design of the smartphone 300. In one embodiment the smartphone 300 is configured to display and operate a virtual key 335 on the touch display 320. It should be noted that the number of virtual keys 335 is dependent on the design of the smartphone 300 and an application that is executed on the smartphone 300. In this example, two virtual keys 335a and 335b are shown.

The smartphone 300 is also equipped with a controller 310 which is responsible for the overall operation of the smartphone 300 and is preferably implemented by any commercially available CPU ("Central Processing Unit"), DSP ("Digital Signal Processor") or any other electronic programmable logic device. The controller 310 is configured to read instructions from a memory 315 and execute these instructions to control the operation of the smartphone 300. The memory 315 may be implemented using any commonly known technology for computer-readable memories such as ROM, RAM, SRAM, DRAM, CMOS, FLASH, DDR, SDRAM or some other memory technology. The memory 315 is used for various purposes by the controller 310, one of them being for storing application data and program instructions for various software modules in the smartphone 300. The software modules include a real-time operating system, drivers for the user interface, an application handler as well as various applications.

The smartphone 300 further comprises a radio frequency interface 340, which is adapted to allow the smartphone 300 to communicate with other devices through a radio frequency band through the use of different radio frequency technologies. Examples of such technologies are short-range standards IEEE 802.11, IEEE 802.15, ZigBee, WirelessHART, WIFI and Bluetooth® and long-range standards W-CDMA/HSPA, GSM, UTRAN and LTE to name a few. It should be noted that, as is commonly known, the radio frequency interface may be arranged to communicate according to more than one technology and many different combinations exist, for example a smartphone is commonly arranged to communicate according to the Bluetooth™ standard, the WiFi standard, the GSM standard and the LTE standard.

The controller 310, the memory 315 and the communication interface 340 are all internal components as is indicated by the dashed boxes representing them in FIG. 3.

The smartphone may thus be connected to the robotic work tool 100 via their respective communication interfaces. Possibly, the connection is made via the internet instead of a direct connection. This has the benefit that the robotic work tool 100 may be controlled by any communication device, also including laptops or other computers, capable of establishing an internet connection.

The smartphone 300 may thus be configured to execute an application for controlling the robotic work tool 100. This application will hereafter be referred to as the mobile application 350 and is at least partially stored in the memory 315 of the smartphone 300. The mobile application may be a resident application or a cloud application.

The mobile application 350 displays a current status and configuration of the robotic work tool on the display 320 of the smartphone 300. The user thus has a possibility to change settings with a simple finger press. From the main menu the user can chose the "Status"-page to view and change the actual state for the robotic work tool to "Stopped", "Parked" and "Mowing". Each Mower status is clearly represented by specific colours (green—Mowing, red—Stopped and Blue—Parked) to alert user which status the connected Mower holds.

Figure 4:
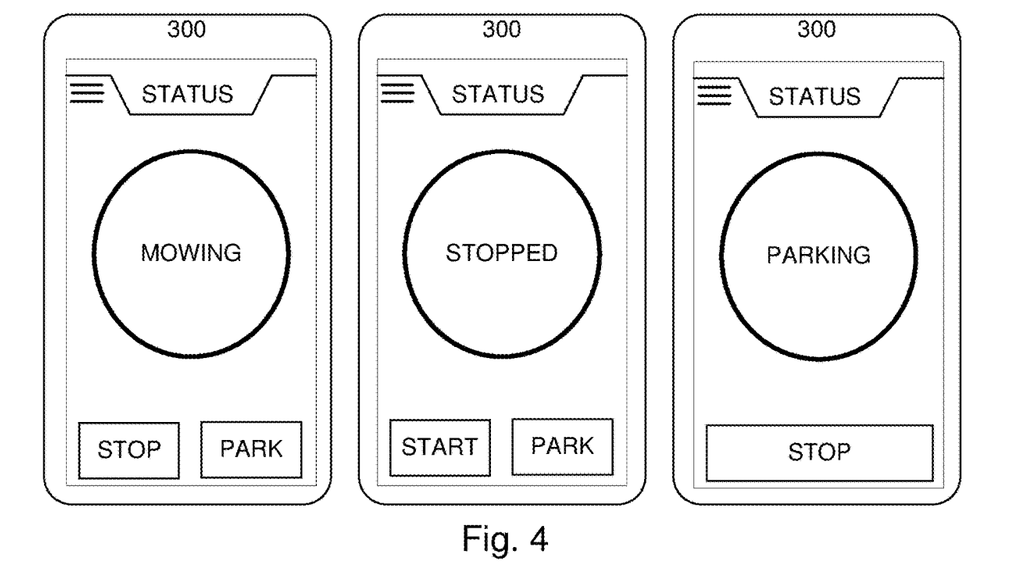
FIG. 4 shows examples of control interfaces being presented on a display according to one embodiment of the teachings of this application.

FIG. 4 shows examples of such control interfaces being presented on the display 320. A first status Mowing is displayed to indicate that the robotic work tool 100 is operating. The status may also be indicated with a green circle indicating a positive ongoing operating status. A second status Stopped may also be displayed to indicate that the robotic work tool 100 is not currently operating. The status may also be indicated with a red circle indicating a stopped operating status. A third status Parking may also be displayed to indicate that the robotic work tool 100 is parking. The status may also be indicated with a blue circle indicating a positive but currently not operating status.

Figure 5:
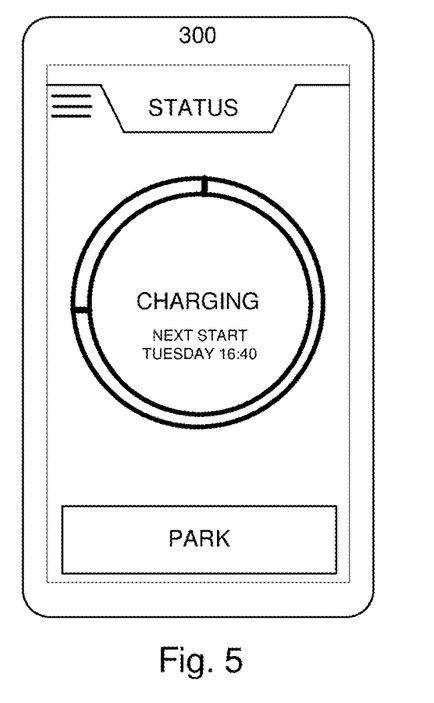
FIG. 5 shows an example of a charging status being presented on a display according to one embodiment of the teachings of this application.

When the robotic work tool is docking due to low battery level the charging status is displayed as a blue progressing circle with a remaining timestamp in the centre of the status ring, see FIG. 5. A time indication for a next start may also be displayed.

Figure 6:
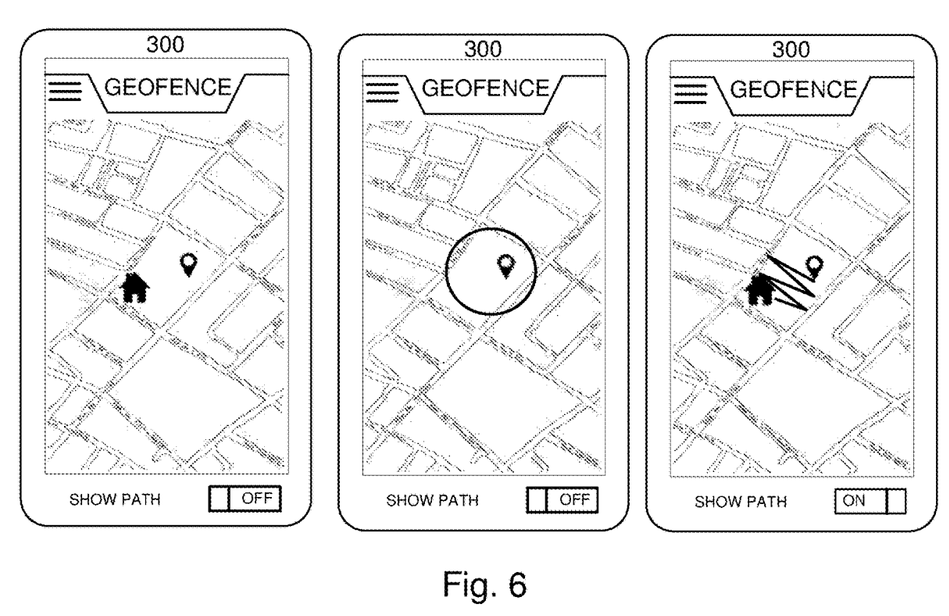
FIG. 6 shows screen shots of a Geofence function according to one embodiment of the teachings of this application.

Through a submenu "Geofence" in the mobile application 350 the user can follow the mower and its moving pattern on a map together with corresponding centre-point and "geofence" area, shown as a blue-faded circle. By touching the centre-point tag the user can view information of GPS-position (lat, long) and geofence sensitivity (low, medium, high). By the function 'geofencing' the user can trace the mower if it has been stolen and follow its every move on the map by the tracking lines drawn on the map based on current GPS-position. When the robotic work tool is carried outside the geofence a theft alarm is sent to the mobile application 350 through a push-notice. If this occurs the robotic work tool gets unusable until a pin code has been aimed through MMI and/or geofence get switched off (also protected by a pin code). See FIG. 6 showing screen shots of the Geofence function showing a protecting area (geofence area) together with GPS-position for the centre-point and the current mower position. If the robotic work tool gets stolen and carried outside the geofence boundary a theft alarm is pushed to the application 350 and alerts the user of the event. The movement is tracked in the map and the robotic work tool can be traced by drawn line visible in the map.

Figure 7:
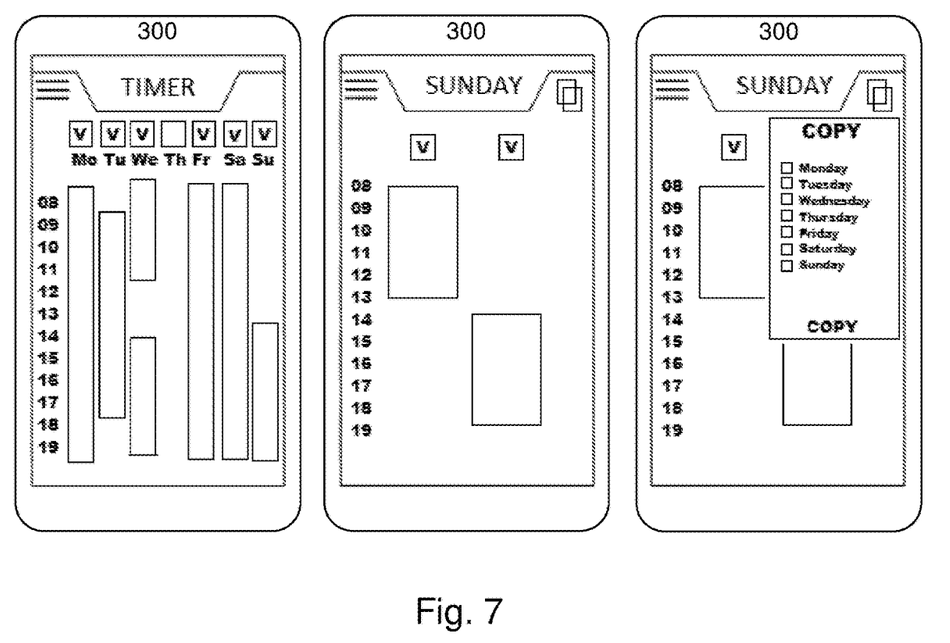
FIG. 7 shows screen shots of a timer function according to one embodiment of the teachings of this application.

A Timer function gives the user possibility to view and set the timer-intervals for the mower, i.e. the intervals which the robotic work tool allows to be active and mow the lawn. The application allows the user to activate and deactivate complete days as well as define intervals freely. By a simple tap on one of the intervals in the view page the user can control each interval by a smooth finger movement on the handles at the ends of the bar. Each day can thereafter easily been copied to all other days by a tap on a copy symbol at the upper right corner in the same menu. A day can contain one or two different intervals. If the intervals are overlapping each other they are emerged into one single interval for that specific day. Hence no stop-timer will be due during such an emerged timer-interval and the robotic work tool will act throughout the whole interval without any interruptions. See FIG. 7 showing screen shots of the Timer function. First is an overview which displays the complete setting for the whole week with each day's specific interval shown in bars. If user tap one of the interval the next "edit" view will be displayed where each interval for that specific day can be adjusted by drag the handles at the end of each bar. The mobile application 350 then allows the user to copy that day to another or for the complete week if so desired.

Through the mobile application 350 it is possible to pair (connect) at least 100 mowers to one account and vice versa, one mower to at least 30 accounts. By a menu option "My Mowers" the user has the advantage of viewing all connected Mowers with corresponding status. The status for one and each of them are live updated and in case of an error in one of the robotic work tools that is not viewed at the specific moment the use will be alerted through a push notice and asked by a popup to switch view and observe the mower whom carries the fault event.

Figure 8:
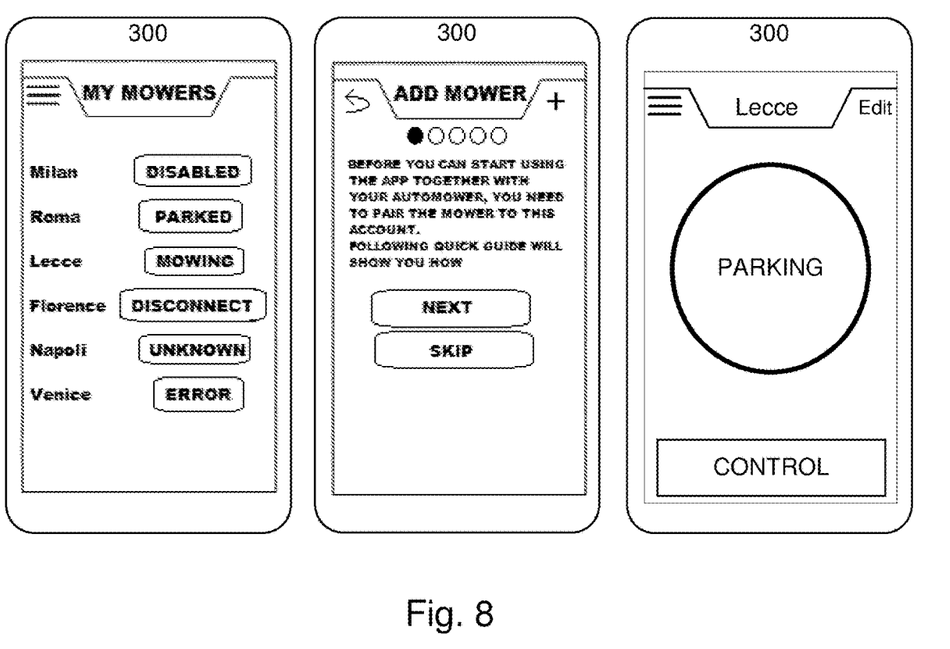
FIG. 8 shows screen shots of a "My Mower" menu option according to one embodiment of the teachings of this application.

By a simple press on the plus button in the upper right corner of the app the user will be able to add more Mowers to the list by a three step procedure easily walked through. By pressing on one of the robotic work tools in the list the mobile application 350 will switch and show the status and control ability for that Mower. Hence this overview page gives the possibility to overview and monitory Mowers used in a cluster for commercial use or only a few for smaller private installations. See FIG. 8 showing screen shots of the "My Mower" menu option which allows the user to view all connected Mowers in a list form. By tapping one of the live updated mowers in the list the user can easily access that specific Mower to apply events or just observe any course of happening. Through the menu it is also easy to add new Mowers or edit its name or just unpair in case of control of a robotic work tool is no longer wanted.

Figure 9:
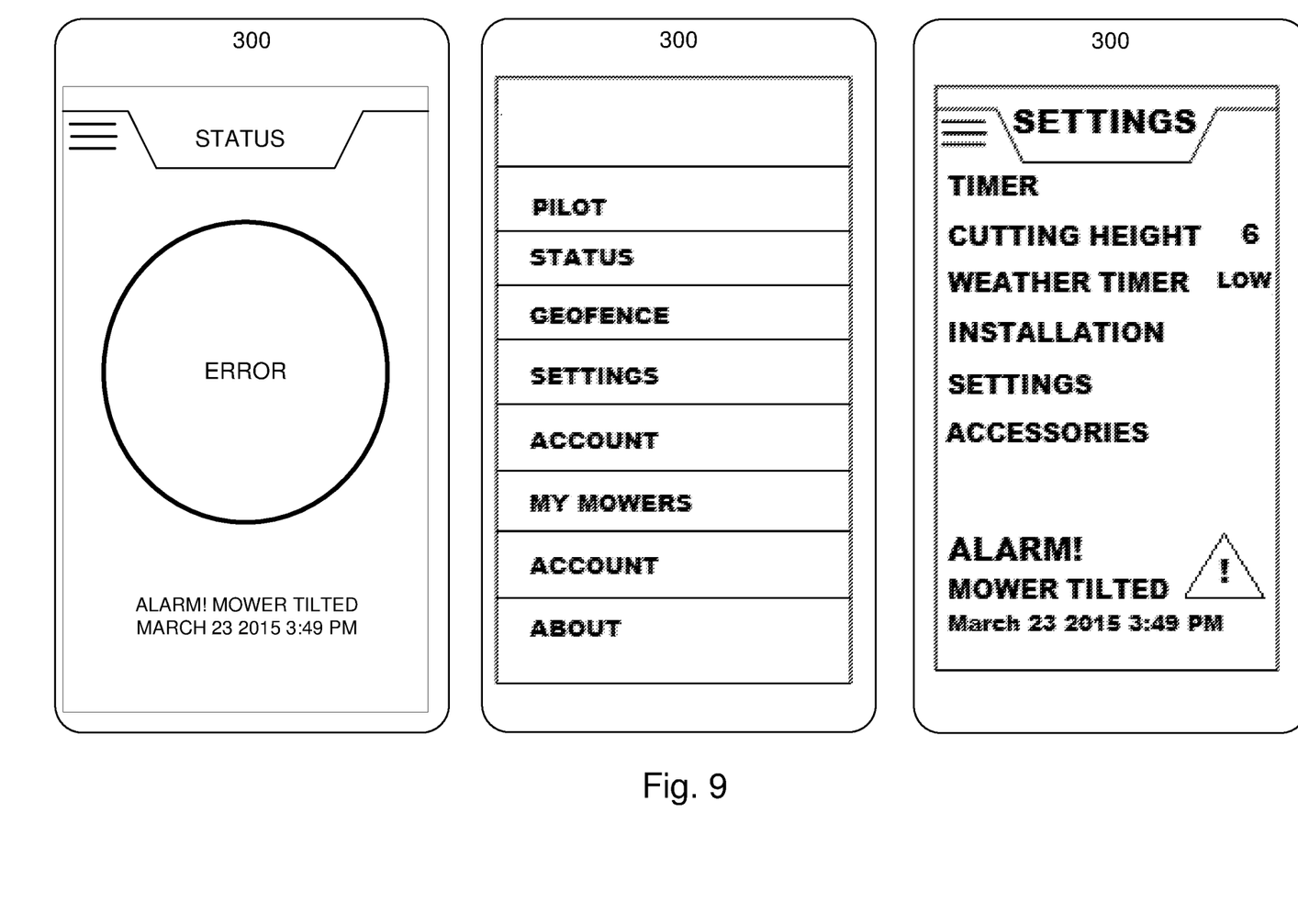
FIG. 9 shows screen shots of a status page showing mower status when a fatal error has occurred in a robotic work tool according to one embodiment of the teachings of this application.

When an error or fatal error is detected in the robotic work tool the user will be immediately updated with this information through the mobile application 350 by a push-notice and corresponding change of Mower status to Error or Fatal error as FIG. 9 displays. When this has occurred the user is urged or required to clear the fatal error in the robotic work tool by use of the user interface (for example through the virtual keys 335) before the robotic work tool can be restarted. The error or fatal error is displayed with a time-stamp and control buttons are hided and out of use. Even though an error or fatal error is registered in the mobile application 350 it still possible to browse menus and submenus without problem though no changes can be applied through the mobile application 350 to the mower. See FIG. 9 showing screen shots of a status page showing mower status when a fatal error has occurred in the robotic work tool.

As a robotic work tool 100 such as a robotic lawnmower carries working tools, in the case of a robotic lawnmower a grass cutting device comprising knives, and as such working tools could possibly pose a danger if misused, the inventors have realized that increased safety is achieved by disabling all operative functions—i.e. functions relating to the operation of the robotic work tool, and not information providing functions or scheduling and/or pairing functions until an error reset signal is received by the robotic work tool, the user is required to physically move to the robotic work tool 100 to solve what ever error situation that has occurred. Even if the robotic work tool 100 could possibly be operated remotely despite the error, this ensures that at least a visual inspection of the robotic work tool 100 is performed before the robotic work tool 100 is restarted or run operatively again.

An example situation is when a robotic lawnmower has accidentally gotten stuck on a stone, bump or other rise. Potentially, this problem could be solved by the user changing the cutting height of the robotic lawnmower through a settings menu. But, by requiring the user to visit the robotic lawnmower to reset it, the user may visually (or otherwise) inspect the robotic lawnmower to ensure that the grass cutting device is still intact, whereas a restart with a damaged cutting device may present a danger to the surroundings. Such danger is thus prevented by the use of the teachings herein.

Another example is if a robotic work tool has gotten stuck. A visual inspection could reveal that the collision detection may have been damaged and the robotic work tool 100 should be properly serviced before being put back into operation.

The mobile application may thus be disabled with regards to any function that puts the robotic work tool back into an operating state. In one embodiment such an operating state relates to moving the robotic work tool by its own propulsion. In one embodiment such an operating state relates to activating the work tool, such as the grass cutting device.

Figure 10:
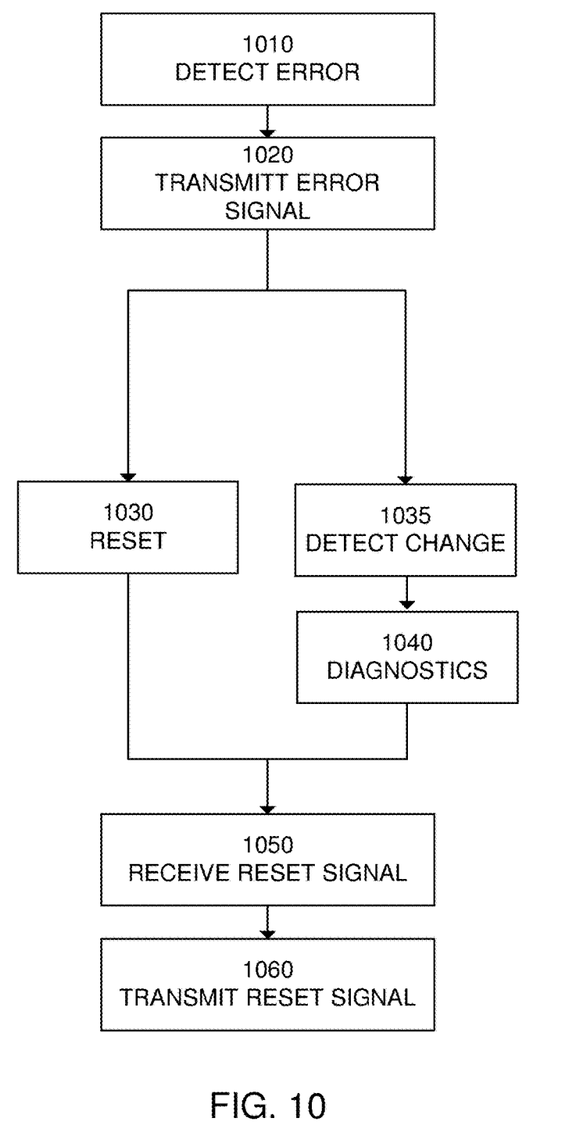
FIG. 10 shows a flowchart for a general method of controlling a robotic lawnmower for movable operation within a work area, according to the teachings herein.
Figure 11:
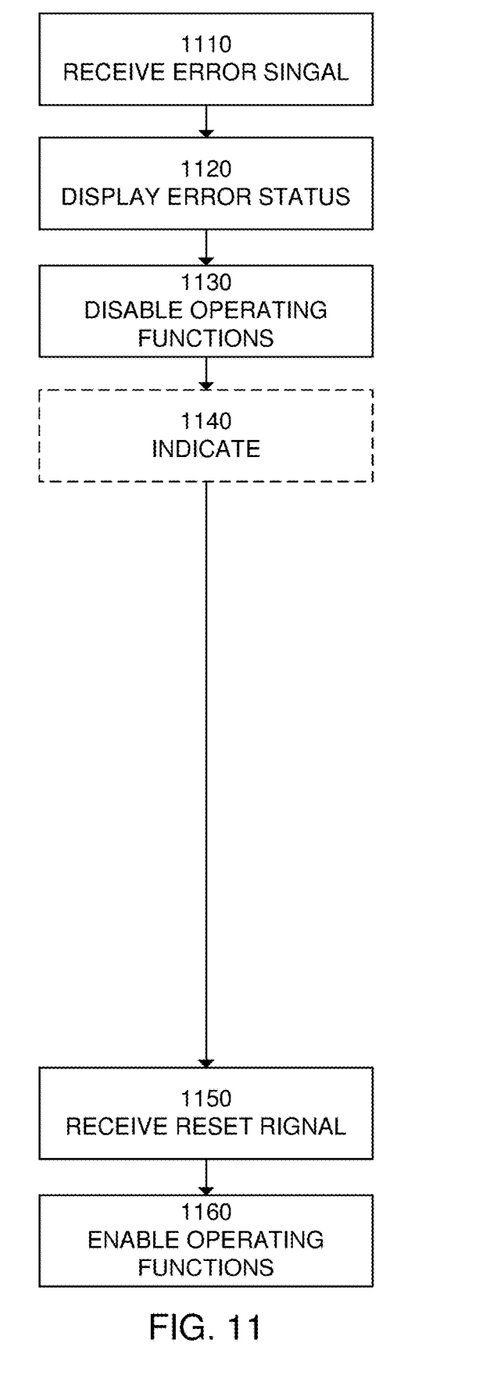
FIG. 11 shows a flowchart for a general method for a mobile application for controlling a robotic lawnmower for movable operation within a work area, according to the teachings herein.

FIG. 10 shows a flowchart for a general method for a robotic work tool according to the teachings herein and FIG. 11 shows a flowchart for a general method for a mobile application for controlling a robotic work tool according to the teachings herein. The functionality of handling an error situation will be given with simultaneous reference to FIGS. 10 and 11.

The robotic work tool detects an error situation 1010 and transmits 1020 an error signal to the mobile application 350. The error signal may carry information on the current error. As the mobile application 350 receives 1110 an error signal from the robotic work tool 100, the mobile application displays 1120 an error status message, as in FIG. 9, on the display of the smartphone 300. The mobile application also disables 1130 all functionality relating to putting the robotic work tool 100 into an operating state. This may be indicated 1140 to the user by changing the colour of such options and/or by presenting a prompt such as a text message informing the user that there is an error present in the robotic work tool and that it needs to be dealt with before any actions are taken. Also, the robotic work tool may present such a prompt each time such a function is selected by the user, and/or when the user tries to change a setting related to such a function. Such prompt could inform the user that a manual reset on the robotic work tool is required to enable the functionality. This indication and/or prompt is optional as indicated by the dashed box in FIG. 11. In one embodiment, the user may be allowed to use the control application even when an error is present, but not make changes or give commands enabling a function relating to the error, without a manual reset.

As the user has inspected the robotic work tool 100, the user can manually reset 1030 the error, for example by pressing a reset button on the robotic work tool 100, whereby the robotic work tool receives a reset signal 1035 from the user. Additionally or alternatively, the robotic work tool 100 can be configured to run 1040 a self diagnostics to ensure that no further errors remain as one error has been handled. As an error has been handled and no more errors prevail, the diagnostics can send a reset signal. The robotic work tool 100 is thus configured to detect 1035 a change imposed by the user. If the diagnostics clears the robotic work tool 100 for operation and/or if the reset button is pressed, that is, when the robotic work tool 100 is in an operating condition again as indicated by the reception of an internal reset signal 1050, the robotic work tool 100 transmits 1060 a reset signal to the mobile application 350. As the mobile application receives 1150 the reset signal, the mobile application enables 1160 the functions relating to changing an operating state again.

As the error is being handled (after it has been detected and until the robotic work tool is reactivated again, by receiving a reactivation signal from the mobile application 350), the operation of the robotic work tool is disabled.

Figure 12:
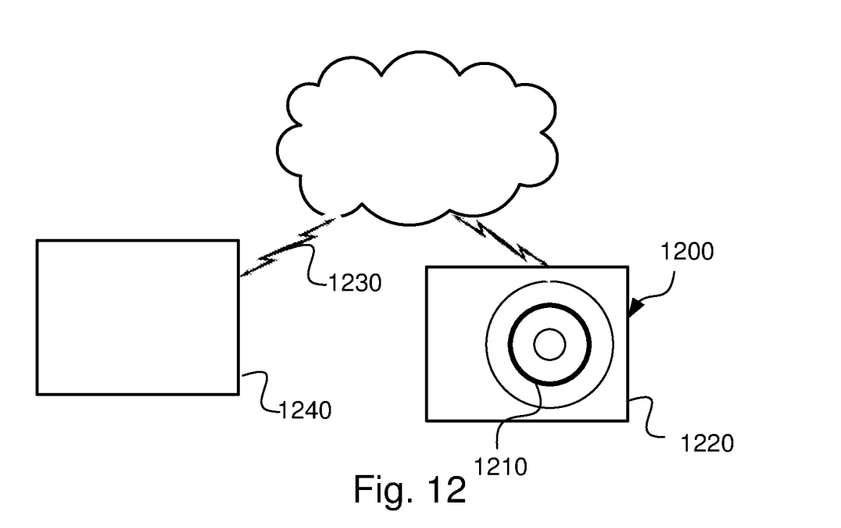
FIG. 12 shows a schematic view of a computer-readable medium according to the teachings herein.

FIG. 12 shows a schematic view of a computer-readable medium as described in the above. The computer-readable medium 1200 is in this embodiment a data disc 1200. In one embodiment the data disc 1200 is a magnetic data storage disc. The data disc 1200 is configured to carry instructions 1210 that when loaded into a controller, such as a processor, execute a method or procedure according to the embodiments disclosed above. The data disc 1200 is arranged to be connected to or within and read by a reading device 1220, for loading the instructions into the controller. One such example of a reading device 1220 in combination with one (or several) data disc(s) 1200 is a hard drive. It should be noted that the computer-readable medium can also be other mediums such as compact discs, digital video discs, flash memories or other memory technologies commonly used. In such an embodiment the data disc 1200 is one type of a tangible computer-readable medium 1200.

The instructions 1210 may also be downloaded to a computer data reading device 1240, such as the controller 110 or other device capable of reading computer coded data on a computer-readable medium, by comprising the instructions 1210 in a computer-readable signal 1230 which is transmitted via a wireless (or wired) interface (for example via the Internet) to the computer data reading device 1240 for loading the instructions 1210 into a controller. In such an embodiment the computer-readable signal 1230 is one type of a non-tangible computer-readable medium 1200.

The instructions may be stored in a memory (not shown explicitly in FIG. 12, but referenced 1200 in FIG. 1) of the computer data reading device 1240.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic lawnmower comprising a wireless communication interface and a controller, wherein the controller is configured to:
   cause the robotic lawnmower to operate by moving;
   detect an error in the robotic lawnmower;
   transmit an error signal through the wireless communication interface to a mobile application on a mobile communications device for controlling the robotic lawnmower;
   detect a change imposed by a user of the robotic lawnmower on the mobile communications device;
   in response to detecting the change imposed by the user, run a diagnostics test to determine if further errors remain;
   in response to the diagnostics test indicating no further errors, receive an internal reset signal; and
   transmit a reset signal through the wireless communication interface to the mobile application for controlling the robotic lawnmower.

2. The robotic lawnmower as defined in claim 1, wherein in response to detecting the error in the robotic lawnmower, the controller is configured to disable operation of the robotic lawnmower until a reactivation signal is received through the wireless communication interface from the mobile application for controlling the robotic lawnmower.

3. The robotic lawnmower as defined in claim 1, wherein the controller is configured to receive a manual reset and in response thereto receive the internal reset signal.

4. The robotic lawnmower of claim 1, wherein the robotic work tool is configured to be charged at a charging station that, along with the robotic lawnmower, forms a portion of a robotic lawnmower system.

5. A mobile communication device comprising a wireless communication interface, a display, a memory and a controller, wherein said controller is configured to execute a mobile application for controlling a robotic lawnmower, wherein the controller is configured to:
   receive an error signal through said wireless communication interface from said robotic lawnmower;
   display an error status on the display;
   disable functions relating to an operating state of the robotic lawnmower;
   receive a reset signal through said wireless communication interface from said robotic lawnmower in response to the robotic lawnmower detecting an error and running a diagnostics test indicating no further errors; and
   enable the functions relating to the operating state of the robotic lawnmower in response to receiving the reset signal.

6. The mobile communication device as defined in claim 5, wherein the operating state relates to moving the robotic lawnmower by its own propulsion.

7. The mobile communication device as defined in claim 5, wherein the operating state relates to activating a work tool of the robotic lawnmower.

8. The mobile communication device as defined in claim 5, wherein the mobile communications device is a smartphone.

9. A method for controlling a robotic lawnmower comprising a wireless communication interface, the method comprising:
   causing the robotic lawnmower to operate by moving;
   detecting an error in the robotic lawnmower;
   transmitting an error signal through the wireless communication interface to a mobile application on a mobile communications device for controlling the robotic lawnmower;
   detecting a change imposed by a user of the robotic lawnmower on the mobile communications device;
   in response to detecting the change imposed by the user, running a diagnostics test to determine if further errors remain;
   in response to the diagnostics test indicating no further errors, receiving an internal reset signal; and
   transmitting a reset signal through the wireless communication interface to the mobile application for controlling the robotic work tool.

10. A method for controlling a mobile communication device comprising a wireless communication interface and a display, the method comprising:
    executing a mobile application for controlling a robotic lawnmower;
    receiving an error signal through said wireless communication interface from said robotic lawnmower;
    displaying an error status on the display;
    disabling functions relating to an operating state of the robotic lawnmower;
    receiving a reset signal through said wireless communication interface from said robotic lawnmower in response to the robotic lawnmower detecting an error and running a diagnostics test indicating no further errors; and
    enabling the functions relating to the operating state of the robotic lawnmower in response to receiving the reset signal.

11. The method of claim 10, wherein the method is executed on a processor configured to execute instructions stored in a non-transitory computer readable storage medium encoded with the instructions.

12. The method of claim 9, wherein the method is executed on a processor configured to execute instructions stored in a non-transitory computer readable storage medium encoded with the instructions.

* * * * *